(12) United States Patent
Yang

(10) Patent No.: US 8,903,432 B2
(45) Date of Patent: Dec. 2, 2014

(54) WIRELESS PAGING METHOD

(75) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2321 days.

(21) Appl. No.: 11/462,635

(22) Filed: Aug. 4, 2006

(65) Prior Publication Data

US 2008/0032713 A1 Feb. 7, 2008

(51) Int. Cl.
*H04W 68/00* (2009.01)
*H04W 68/04* (2009.01)

(52) U.S. Cl.
CPC ..................... *H04W 68/04* (2013.01)
USPC ........ 455/458; 455/435.2; 455/434; 455/512; 455/435.3; 455/513; 370/338

(58) Field of Classification Search
USPC ............... 455/458, 525, 439, 437, 440, 432, 455/432.1–444, 512–513; 370/442, 347, 370/342, 338
See application file for complete search history.

(56) References Cited

U.S. PATENT DOCUMENTS

| | | | |
|---|---|---|---|
| 5,369,681 A | 11/1994 | Boudreau et al. | |
| 5,734,984 A * | 3/1998 | Reece et al. | 455/458 |
| 5,875,400 A * | 2/1999 | Madhavapeddy et al. | 455/458 |
| 6,181,933 B1 | 1/2001 | Jeong | |
| 6,181,945 B1 | 1/2001 | Lee | |
| 6,400,943 B1 | 6/2002 | Montoya | |
| 6,968,196 B1 * | 11/2005 | Back et al. | 455/456.5 |
| 8,126,482 B2 * | 2/2012 | Teague et al. | 455/458 |
| 8,140,072 B1 * | 3/2012 | Vargantwar et al. | 455/435.2 |
| 8,150,395 B2 * | 4/2012 | Cho et al. | 455/435.1 |
| 8,219,120 B2 * | 7/2012 | Du et al. | 455/458 |
| 8,244,280 B2 * | 8/2012 | Willey | 455/458 |
| 8,320,398 B2 * | 11/2012 | Li et al. | 370/462 |
| 8,712,446 B2 * | 4/2014 | Kamdar et al. | 455/458 |
| 2001/0034233 A1 * | 10/2001 | Tiedemann et al. | 455/436 |
| 2005/0282562 A1 * | 12/2005 | Lee et al. | 455/458 |
| 2009/0181672 A1 * | 7/2009 | Horn et al. | 455/435.1 |

FOREIGN PATENT DOCUMENTS

| | | | |
|---|---|---|---|
| CN | 1802011 A | 7/2006 | |
| EP | 1662824 A1 | 5/2006 | |
| WO | 9859516 A1 | 12/1998 | |
| WO | WO 9859516 A1 * | 12/1998 | H04Q 7/38 |
| WO | 2008031268 A1 | 3/2008 | |

OTHER PUBLICATIONS

Krishnamachari, Bhaskar, et al., "Optimal Sequential Paging in Cellular Networks," Cornell University—School of Electrical and Computer Engineering, 23 pgs, date unknown.

Scourias, John, et al., "A Dynamic Individualized Location Management Algorithm," University of Waterloo—Department of Computer Science. 5 pgs, date unknown.

(Continued)

*Primary Examiner* — Sharad Rampuria

(74) *Attorney, Agent, or Firm* — Conley Rose, P.C.; Grant Rodolph

(57) ABSTRACT

A wireless network component comprising: a processor configured to implement steps including: receiving a request to establish communications with a wireless terminal, generating a paging list comprising a plurality of cells using a location data for a wireless terminal, and paging the wireless terminal using the cells in the paging list is disclosed.

13 Claims, 6 Drawing Sheets

(56) References Cited

OTHER PUBLICATIONS

Chuon, Chansophea, et al., "DIP-MIP: Distributed Individual Paging Extension for Mobile IP in IP-Based Cellular Networks," Asian Institute of Technology—Computer Science & Information Management Program, 6 pgs, date unknown.

Lei, Zhuyu, et al., "Paging Area Optimization Based on Interval Estimation in Wireless Personal Communication Networks," Mobile Networks and Applications, pp. 1-18, date unknown.

Naidu, Mullaguru, et al., "CDMA2000 for Wireless in Local Loop Networks," Qualcomm, Dec. 2004, pp. 1-20.

Das, Suman, et al., "Distributed Paging and Registration in Wireless Networks," IEEE Network, Sep./Oct. 2005, pp. 19-25.

Foreign Communication From a Related Counterpart Application—International Search Report and Written Opinion, PCT/CN/2006/002328, Jun. 14, 2007, 6 pages.

\* cited by examiner

WIRELESS PAGING METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed generally to wireless communication networks, and specifically to an improved paging method for wireless networks.

BACKGROUND

Circuit switch and packet data switch communications networks (collectively, data networks) use wireless networks to communicate with wireless devices, such as cellular telephones or laptop computers. Wireless networks are generally divided into several location areas (LAs) according to geographical area. Each LA contains a Radio Access Controller (RAC) that communicates with a plurality of base transceiver stations (BTSs) in the LA. The BTSs contain wireless transceivers that allow the BTSs to communicate with the wireless devices within the BTS' coverage area, or "cell." Once the BTS and the wireless device establish communications with one another, the data networks may freely communicate with the wireless device through the wireless network.

As part of the process of establishing communication between the BTS and the wireless device, the Base Station Controller (BSC) must first determine the location of the wireless device using a paging method. Briefly, paging involves the transmission of paging messages over several BTSs or even several LAs so that the location of the wireless device can be determined. The BSC uses a paging method to locate the wireless device so that the BSC knows which BTS to use to communicate with the wireless device. Because the existing paging methods are time consuming and utilize too many network resources, a need exists for an improved method for paging wireless devices in a wireless network.

SUMMARY

In one aspect, the invention includes a wireless network component comprising: a processor configured to implement steps including: receiving a request to establish communications with a wireless terminal, generating a paging list comprising a plurality of cells using a location data for a wireless terminal, and paging the wireless terminal using the cells in the paging list. In an embodiment, the steps further comprise: modifying the cells in the paging list. In another embodiment, the generating step comprises: creating the paging list using the location data to define a base cell, and expanding the paging list using a spatial data to define an adjacent cell. Variously, the base cell may be the cell that the wireless terminal most recently connected with, and the adjacent cell may be physically next to the base cell. The paging list may be expanded a plurality of times. In yet another embodiment, the modifying step comprises: removing the duplicate cells from the paging list. The modifying step may comprise: prioritizing the cells in the paging list. The cells in the paging list may be prioritized based on the distance from a base cell, or based on the probability that the wireless terminal will connect with the cells. In another embodiment, the modifying step comprises: removing lower priority cells from the paging list until the cells in the paging list no longer exceed a predetermined quantity. Finally, the location data may include the cell that the wireless terminal last connected with and other cells that the wireless terminal has connected with.

In a second aspect, the invention includes a wireless network comprising: a controller coupled to a data network, a plurality of base transceiver stations coupled to the controller, the base transceiver stations in wireless communication with a plurality of wireless terminals, and a database in communication with the controller or one of the base transceiver stations, the database comprising a location data, wherein communication is established between one of the wireless terminals and the data network, the communications being established at least in part by the controller identifying a group of base transceiver stations corresponding to the location data for the wireless terminal and limiting a transmission of a paging message to the group of base transceiver stations. In one embodiment, the controller further prioritizes the group, removes duplicate base transceiver stations from the group, and removes lower priority base transceiver stations that exceed a predetermined quantity, prior to the transmission of the paging message. In another embodiment, the location data identifies a first base transceiver station that the terminal most recently connected to, and the group is identified and prioritized based on a spatial data related to the first base transceiver station. In yet another embodiment, the database comprises probability data that identifies a probability for the first terminal to respond to the paging message sent by each of the base transceiver stations and the group is prioritized based on the probability.

In a third aspect, the invention includes a method of paging a wireless terminal in a wireless network, the method comprising: receiving a request to establish communications with a wireless terminal, creating a paging list comprising a plurality of cells, the paging list being created using a location data to define a base cell, expanding the paging list using a spatial data to define an adjacent cell, prioritizing the cells in the paging list, and paging the wireless terminal using the cells in the paging list. In one embodiment, the modifying step comprises: removing some of the cells from the paging list, wherein the removed cells are: duplicate cells or low priority cells. In other embodiment, the wireless network is a wireless local loop. Finally, the cells in the paging list may be prioritized based on the probability that the wireless terminal will connect with the cells.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Described herein is an improved method for paging a wireless terminal (WT) that minimizes the paging traffic and the overall effect that the paging process has on the wireless network. Instead of simultaneously paging cells within the wireless network, the present paging method creates a list of cells that the WT is likely to communicate with, which may be referred to herein as a paging list. The paging list may be prioritized and any duplicate cells may be removed from the list. Further, any lower priority cells exceeding a predetermined quantity may be removed from the paging list. Upon generating the paging list, the wireless network uses the paging list to page the WT. Thus, the paging method may be described as a cell-based boundary extension paging method.

Figure 1:
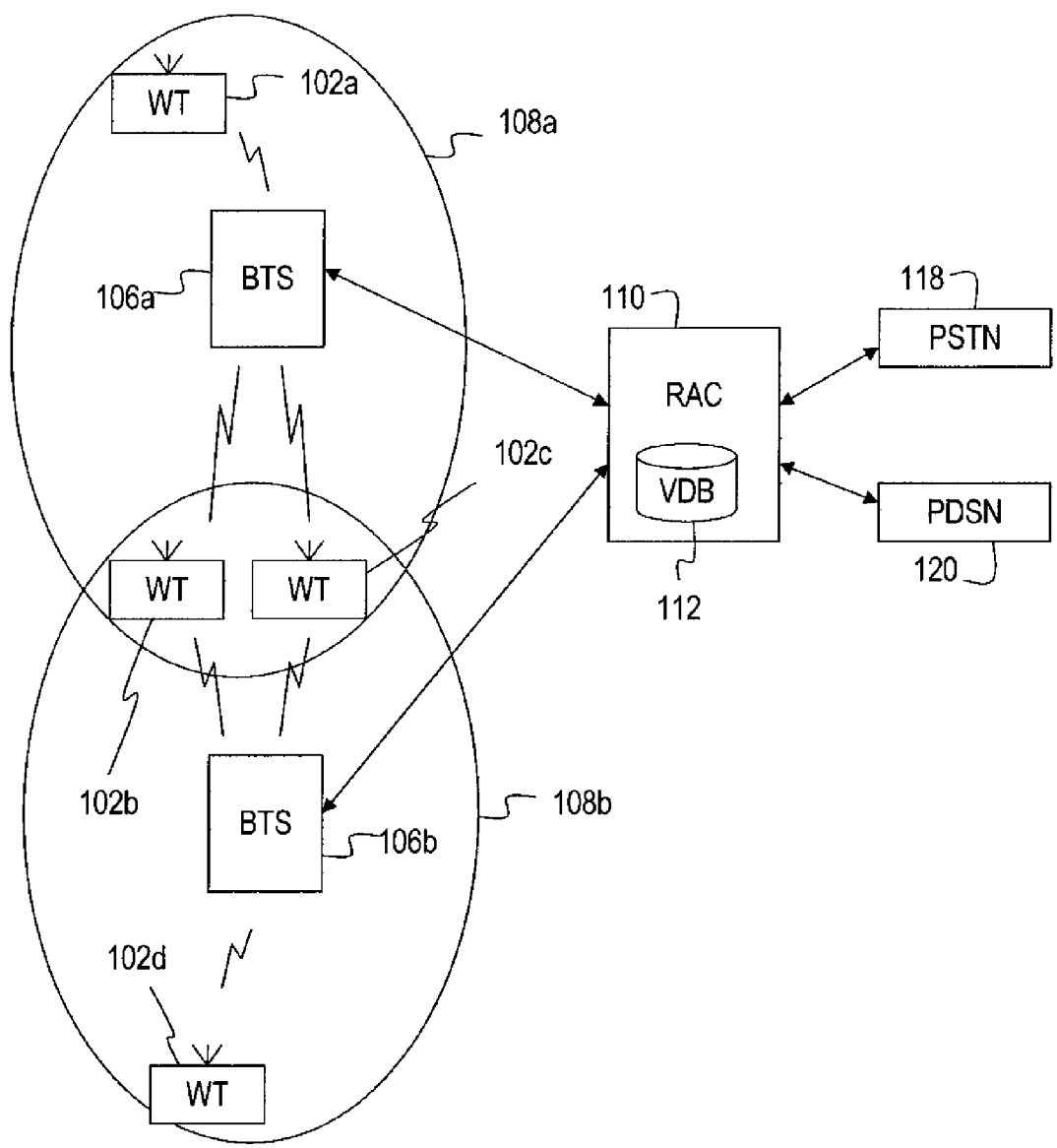
FIG. 1 is an example of the conceptual framework of one embodiment of a wireless communications system.

FIG. 1 illustrates one example of a wireless network, which may be a cellular network, a local area network (LAN), or a wireless local loop (WLL). The term local loop refers to the link between a customer location, such as a business or residence, and the edge of a telecommunications provider's network. In the traditional plain old telephone system (POTS), the local loop connects the businesses and residences with a central office (CO) via twisted pairs of copper wires. However, it is becoming increasingly common for local loops to be implemented wirelessly because wireless local loops are easier and cheaper to install and operate.

As seen in FIG. 1, the wireless network comprises a plurality of WTs 102a, 102b, 102c, 102d (collectively, 102) in communication with a plurality of base transceiver stations (BTSs) 106a, 106b (collectively, 106). Also depicted is the coverage area for the BTSs 106, known as "cells" 108a, 108b (collectively, 108). Each of the BTSs 106 is in communication with a radio access controller (RAC) 110. The RAC 110 is also in communication with various data networks, such as a public switched telephone network (PSTN) 118 and a packet data serving node (PDSN) 120. The wireless network contains a visitor database (VDB) 112, which in one embodiment is located in the RAC 110. As explained in further detail below, the VDB 112 may contain data related to the location of the WTs 102, while the RAC 110 may contain data related to the spatial orientation of the cells. As discussed in more detail below, the location data and spatial data are used by the paging method to increase the paging efficiency within the wireless network.

The wireless network contains several WTs 102, which may be fixed terminals or mobile terminals. In the fixed terminal embodiment, the WTs 102 are residences, businesses, relatively fixed computing devices, such as workstations, desktop computers, automatic teller machines (ATMs), or combinations of such devices. In the embodiment where the wireless network is a WLL, the WTs 102 may represent a customer location and the BTSs 106 may represent the edge of the telecommunications provider's network. In the mobile terminal embodiment, the WTs 102 are notebook computers, cellular telephones, personal data assistants (PDAs), or combinations of such devices. In an alternative embodiment, the WTs 102 may be a combination of fixed terminals and mobile terminals.

The wireless network also contains several BTSs 106 that communicate with the WTs 102. The BTSs 106 contain wireless transceivers that allow the BTSs 106 to wirelessly transmit signals to and receive signals from the WTs 102. The BTSs 106 also communicate with the RAC 110, generally using high-speed fixed communications methods, such as fiber optics, that are well known to persons of ordinary skill in the art. However, it is contemplated that the BTSs 106 and the RAC 110 may use wireless or other communication methods, such as the wireless communications methods described herein.

Each BTS 106 has a limited range due to various network and environmental factors. To overcome the limited range of the BTSs 106, wireless networks contain several cells 108 arranged in an overlapping configuration that minimizes the gaps between the cells 108. Wireless networks use overlapping cells 108 to provide sufficient wireless coverage over the network. The overlap also ensures that the WTs 102 can move from one cell to another cell without losing their wireless connection. The overlapping region of the wireless device generally resides in the paging signal of a certain cell. Such a configuration minimizes bandwidth use and resource consumption within the wireless network.

The wireless network also contains the RAC 110. The RAC 110 is a central communications hub for the BTSs 106. The RAC 110 may control wireless access between the WTs 102 and the BTSs 106 by allowing only authorized WTs 102 to communicate with the BTSs 106. The RAC 10 controls wireless access within at least one location area (LA), and may be a base station controller (BSC). The RAC 110 also communicates with data networks such as the PSTN 118 and the PDSN 120. The communication between the RAC 110 and the data networks generally uses high-speed fixed communications methods, such as fiber optics, that are well known to persons of ordinary skill in the art. However, it is contemplated that the RAC 110 and the data networks may use wireless or other communication methods, such as the wireless communications methods described herein.

The wireless network may also contain a data network. As used herein, the term "data network" describes both circuit switch networks and packet data switch networks. Circuit switch networks generally provide voice services to the wireless network. An example of a circuit switch network is the PSTN 118. Packet data switch networks generally provide data services to the wireless network. Examples of packet data switch networks include the PDSN 120 and the Internet.

The wireless network also contains the VDB 112. The VDB 112 contains location data related to the WTs 102. The location data may include: the physical location of the WT 102, the cell that each WT 102 last connected with, a list of other cells that each WT 102 has connected with, or the cell that each WT 102 is currently connected with. The location data may also include the physical location of each WT 102 as provided by a land-based positioning system, such as a triangulation system, or space-based positioning system, such as the Global Positioning System (GPS). The VDB 112 may also contain other information related to the WTs 102, such as subscription data related to the user(s) for each WT 102, services that are available to the user(s), WT 102 authentication data, or WT 102 device information. Table 1 illustrates an example of the location data for one WT 102.

TABLE 1

| WT | Last Cell the WT Connected With | Other Cells That The WT Has Connected With |
|---|---|---|
| A | $Cell_{21}$ | $Cell_{22}$ |
| B | $Cell_{22}$ | $Cell_{21}$, $Cell_{24}$ |
| C | $Cell_{25}$ | $Cell_{22}$, $Cell_{23}$, $Cell_{24}$, $Cell_{26}$ |
| D | $Cell_{24}$ | None |

The wireless network also contains spatial data related to the cells. In an embodiment, the spatial data is stored in the RAC. The spatial data may be a table that identifies every cell in the wireless network, the cells adjacent to each cell, and the LA for each cell. In various embodiments, the adjacent cells are those cells that overlap a given cell in the wireless network, the cells that are next to but do not overlap the given cell, and combinations thereof. The spatial data may also include other information related to the cells, such as the size of the cell's coverage area, the distance between cells, geographical coordinates for the cells, information related to how the size of the cell's coverage area changes, and so forth. Table 2 illustrates an example of the spatial data for the wireless network shown in FIG. 4.

TABLE 2

| Cell | Location Area | Adjacent Cells |
|---|---|---|
| $Cell_{11}$ | 1 | $Cell_1$, $Cell_{12}$, $Cell_{16}$, $Cell_{101}$, $Cell_{102}$, $Cell_{112}$ |
| $Cell_{12}$ | 1 | $Cell_1$, $Cell_{11}$, $Cell_{13}$, $Cell_{102}$, $Cell_{103}$, $Cell_{104}$ |
| $Cell_{13}$ | 1 | $Cell_1$, $Cell_{12}$, $Cell_{14}$, $Cell_{104}$, $Cell_{105}$, $Cell_{106}$ |
| $Cell_{14}$ | 2 | $Cell_1$, $Cell_{13}$, $Cell_{15}$, $Cell_{106}$, $Cell_{107}$, $Cell_{108}$ |

In some embodiments, the spatial data may be prioritized. In one embodiment, the priority of the adjacent cells is based on the size of the overlap with the base cell. In another embodiment, the priority of the adjacent cells is determined by measuring a continual wireless pilot signal, such as Pilot Strength Measurement Message (PSMM) data. The priority of the adjacent cells can be based on physical considerations as well. For example, if the overlap of two cells is large or covers an important area, such as a road, a busy area, or an area that otherwise experiences increased wireless network activity, then the priority of these two cells may be increased. The priority of these two cells is increased because the probability of the user moving from a cell to one of the higher priority cells is increased. Table 3 illustrates the prioritized spatial data for a plurality of cells, where the larger priority numbers represent greater priorities.

TABLE 3

| Cell | Location Area | Adjacent Cells, Priority Value |
|---|---|---|
| $Cell_1$ | 1 | [$Cell_{11}$, 0.3], [$Cell_{12}$, 0.2], [$Cell_{13}$, 0.2], [$Cell_{14}$, 0.1], [$Cell_{15}$, 0.1], [$Cell_{16}$, 0.1] |
| $Cell_{11}$ | 1 | [$Cell_1$, 0.3], [$Cell_{12}$, 0.2], [$Cell_{16}$, 0.2], [$Cell_{101}$, 0.1], [$Cell_{102}$, 0.1], [$Cell_{112}$, 0.1] |
| $Cell_{12}$ | 1 | [$Cell_1$, 0.2], [$Cell_{11}$, 0.2], [$Cell_{13}$, 0.2], [$Cell_{102}$, 0.2], [$Cell_{103}$, 0.1], [$Cell_{104}$, 0.1] |

In an alternative embodiment, the wireless network may also store statistical data for each WT that accesses the wireless network. The statistical data may include a list of all of the cells that a WT has connected to, the priority of those cells, an indication of the time of day that the WTs connect to each of the BTSs, and so forth. The statistical data may be used to determine the probability for each WT to be located within each of the cells in the paging list and create the prioritized spatial data.

Many different protocols may be used for communication in the wireless network. For example, the WTs 102 communicate with the BTSs 106 using a wireless protocol, such as Asynchronous Transfer Mode (ATM), Internet Protocol (IP), or those defined in Institute of Electrical and Electronics Engineers (IEEE) standard 802.x. The RAC 110 communicates with the BTSs 106 using any appropriate protocol, such as an Abis interface. Further, the RAC 110 communicates with circuit switch networks using an appropriate protocol, such as the V5-PSTN protocol. Similarly, the RAC 110 communicates with packet data switch networks using a packet data switch protocol, such as A10/A11. If additional security is desired, the wireless communications between the WTs 102 and the BTSs 106 may be encrypted using one of the encryption algorithms known to persons of ordinary skill in the art.

Figure 2:
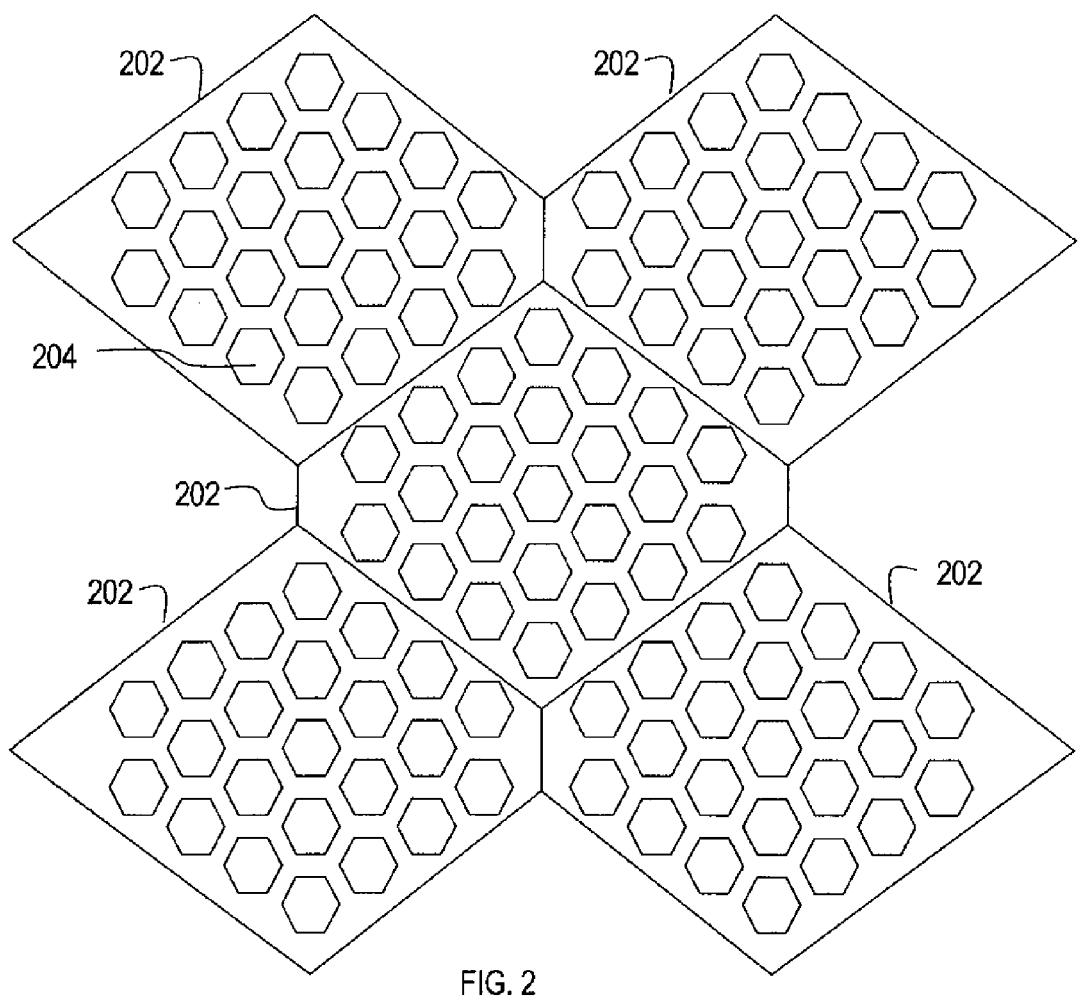
FIG. 2 is a diagram of one embodiment of the configuration of cells and location areas.

In an embodiment, the BTSs 106 in the wireless network are organized into a plurality of LAs. FIG. 2 illustrates a wireless network containing a plurality of cells 204 that have been divided into five LAs 202. Each LA 202 contains several BTSs (not shown), such as those described above. In addition, each LA 202 may also contain a RAC or BSC (neither shown in FIG. 2) that controls the BTSs in the LA 202. Each BTS in the LAs 202 is associated with at least one cell 204 to provide wireless coverage across the LA 202. For example, a single BTS may control from about 1 to about 36 cells 204. While the cells 204 in FIG. 2 are shown as non-overlapping discontinuous regions, this is merely for illustrative purposes to show that each BTS has a unique coverage area. In practice, the cells 204 may partially or completely overlap several other cells 204 so that the wireless network provides continuous coverage across the entire LA 202, particularly when one of the cells 204 is unable to function properly. Similarly, each LA 202 may and probably will overlap slightly with any adjacent LAs 202 in the wireless network. While it is the goal to create continuous coverage across an entire LA 202, due to reasons such as geographic limitations and lack of a sufficient customer base, there may be pockets or areas within a LA 202 that do not have coverage.

Before the BTS can communicate with the WT, the wireless network must first determine which BTS the WT is closest to or should communicate with. Consequently, the wireless network may implement a paging method to determine the location of the WT. When the appropriate WT receives the paging message from one of the BTSs, the WT may reply back to the BTS to establish communications with the RAC. The RAC may then extend the communications up to the data networks.

As part of the paging process, the wireless network has to send out the paging message over a plurality of cells because the wireless network cannot reliably predict which cell a WT is in. For example, the WTs may be mobile terminals that move from one location to another. Even if the WTs are fixed terminals, the wireless network cannot reliably predict which cell a WT is in because the size of the cell's coverage area is constantly changing. In an embodiment, the size of the cell's coverage area may be defined by the cell's wireless signal coverage radius. Specifically, the size of each cell's coverage area is constantly changing in response to network factors, such as the cells' capacity and congestion, as well as environmental factors such as the weather, vehicles and buildings. The WTs may move from one cell to another cell by changing their physical location, by a change in the size of the cells' coverage area, or combinations thereof. In an embodiment, the change in the size of the cells' coverage area follows a pattern. In such an embodiment, the probability of the user being in a cell is the greatest when the user is near the last cell he connected with, while the probability decreases as the user moves farther away from the last cell he connected with. Thus, although FIG. 1 depicts WTs 102b, 102c located in the region of cell overlap, the WTs 102b, 102c will be covered by cell 108a, cell 108b, or both cells 108a, 108b at various times. To accommodate the shifting location of the cells 108a, 108b, the wireless system may need to page both cells 108a, 108b to establish communications with either of the WTs 102b, 102c. The cells may be paged sequentially to avoid interference between the two cells or over-amplification of the paging message. However, paging only a single cell at a time results in a low paging efficiency. Paging efficiency is defined as the success rate for connecting to a WT on the first paging attempt. A high paging efficiency reduces network traffic by reducing the need to perform subsequent paging attempts on other cells.

One method for increasing the paging efficiency is to extend the paging range from one cell to all of the cells in a LA. By extending the paging range to all of the cells there may be considerable impact on the network traffic. This impact may include over-amplification of the paging message and may cause a dramatic increase in the paging load that may exceed the paging channel load capacity. The paging method discussed below improves the success rate for connecting to a WT on a first paging attempt, thus increasing paging efficiency while reducing network traffic.

Figure 3:
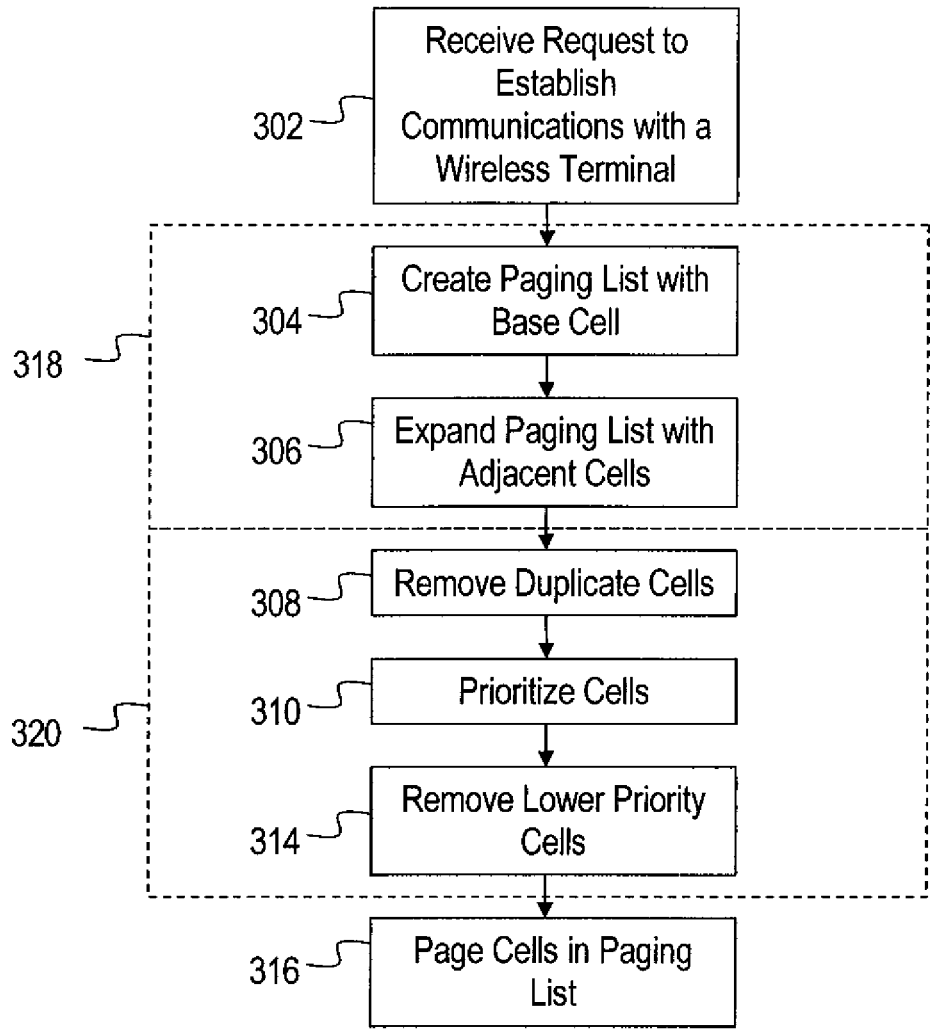
FIG. 3 is a flowchart of one embodiment of the paging method.

FIG. 3 is a flowchart of one example of a paging method for the wireless network. Briefly, the paging method comprises: receiving a request to establish communications with a WT at block 302, generating a paging list at block 318, modifying the paging list at block 320, and paging the cells in the paging list at block 316. Generating the paging list at block 318 may comprise: creating the paging list with the base cell at block 304, and expanding the paging list with the adjacent cells at block 306. Modifying the paging list at block 320 may comprise: removing the duplicate cells from the paging list at block 308, prioritizing the cells in the paging list at block 310, and removing the lower priority cells from the paging list at block 314. Each of these paging method steps is described in further detail below.

The paging method may comprise receiving a request to establish communications with the WT at block 302. Generally, one of the data networks initiates the request to establish communications with the WT when the data network has data that it needs to transmit to the WT. However, it is within the scope of the invention that the request to establish communications with the WT may come from other sources, such as the RAC, one of the BTSs, or even another WT, particularly when one of these wireless network components needs to transmit data to the WT. It is also within the scope of the present invention that one of the wireless network components may initiate the request without the need to transmit data, such as when one of the wireless network components wants to know the present location of the WT.

The paging method may further comprise creating the paging list with the base cell at block 304. As shown in table 1 above, the location data for the WT includes: the cell that the WT last connected with, a list of other cells that the WT has connected with, or the cell that the WT is currently connected with. The paging method uses the location data to define the base cell. For example, the base cell is defined as the cell that the WT last connected with. In another example, the base cell is defined as the group of cells comprising: the cell that the WT last connected with, and a list of other cells that the WT has connected with. After the base cell has been defined, the paging method creates the paging list that initially comprises the base cell.

The paging method may further comprise expanding the paging list with the adjacent cells at block 306. As shown in table 2 above, the wireless network contains spatial data regarding the cells in the wireless network. Specifically, the spatial data knows which cells are adjacent to every cell in the wireless network. The paging method uses the spatial data to determine which cells are adjacent to the base cells, and then expands the paging list by adding the adjacent cells to the base cell to the paging list.

In an embodiment, the paging list may be expanded more than once to produce a multiple expanded paging list. For example and with reference to the wireless network shown in FIG. 4, the base cell may be $Cell_1$, and thus the paging list would initially contain ($Cell_1$). A single expansion would add the cells adjacent to $Cell_1$ to the paging list, such that the paging list contains ($Cell_1$, $Cell_{11}$, $Cell_{12}$, $Cell_{13}$, $Cell_{14}$, $Cell_{15}$, and $Cell_{16}$). A second expansion of the paging list would add the cells that are adjacent to the cells already in the paging list, such that the paging list contains ($Cell_1$, $Cell_{11}$, $Cell_{12}$, $Cell_{13}$, $Cell_{14}$, $Cell_{15}$, $Cell_{16}$, $Cell_{101}$, $Cell_{102}$, $Cell_{103}$, $Cell_{104}$, $Cell_{105}$, $Cell_{106}$, $Cell_{107}$, $Cell_{108}$, $Cell_{109}$, $Cell_{110}$, $Cell_{111}$, and $Cell_{112}$). When expanding the paging list multiple times, the paging list can be reviewed to ensure that no cells are duplicated, as exemplified by the previous list. Alternatively, the method may simply keep the duplicate cells in the paging list as part of the expansion process, particularly when the duplicate cells will be removed per block 308 described below. The multiple expansion of the paging list may continue until the quantity of cells in the paging list meets or exceeds a predetermined network limitation. Such an embodiment increases the probability of successfully paging the WT on a first attempt, and thus increases paging efficiency. Such an embodiment is also useful when paging WT that move quickly from one cell to another cell.

When the paging list is expanded more than once, the priority of the cells may be adjusted to account for the multiple expansions. In one embodiment, the priority of the cells in the additional expansions is equal to the product of the priorities of the expanded cell and the cell from which the expanded cell was expanded. For example and with reference to FIG. 4, when the base cell is $Cell_1$ and the paging list is expanded a second time, $Cell_{102}$ is one of the cells added to the paging list. $Cell_{102}$ is added as one of the cells adjacent to $Cell_{11}$, therefore the priority of $Cell_{102}$ in the paging list may be defined as the product of the priority of $Cell_{11}$, relative to $Cell_1$ multiplied by the priority of $Cell_{102}$ relative to $Cell_{11}$. Using the data from Table 3 above, the priority of $Cell_{102}$ relative to $Cell_1$ would be:

Priority of $Cell_{102}$ relative to $Cell_1$=(Priority of $Cell_{11}$ relative to $Cell_1$)×(Priority of $Cell_{102}$ relative to $Cell_{11}$)=(0.3)×(0.1)=0.03

If the paging list were expanded a third time, the priority of the cells in the third expansion would be equal to the product of the three priorities. Thus, the more times the paging list is expanded, the lower the priority of the expanded cells.

In some multiple expansion embodiments, an expanded cell may be adjacent to two or more cells from a previous expansion. For example, $Cell_{102}$ is adjacent to both $Cell_{11}$ and $Cell_{12}$, whereas $Cell_{101}$ is only adjacent to $Cell_{11}$. When a cell is adjacent to two or more cells from a previous expansion, the priority of the expanded cell can be based upon the previously expanded cell with the highest priority, the previously expanded cell with the lowest priority, or the average of the two previously expanded cells' priorities. If the priority is the average of the two previously expanded cells' priorities, the priority of $Cell_{102}$ relative to $Cell_1$ would be:

Priority of $Cell_{102}$ relative to $Cell_1$=0.5×(((Priority of $Cell_{11}$ relative to $Cell_1$)×(Priority of $Cell_{102}$ relative to $Cell_{11}$))+((Priority of $Cell_{12}$ relative to $Cell_1$)×(Priority of $Cell_{102}$ relative to $Cell_{12}$)))= 0.5×(((0.3)×(0.1))+((0.2)×(0.2)))=0.035

Persons of ordinary skill in the art will appreciate that the priority calculations described herein are based upon the shortest path between the expanded cell and the base cell. For example, the shortest path between $Cell_{101}$ and $Cell_1$ is through $Cell_{11}$, whereas the shortest path between $Cell_{102}$ and $Cell_1$ is through either $Cell_{11}$ or $Cell_{12}$. However, it is also contemplated that the priority calculations described herein can be based on paths other than the shortest path, particularly when there is a high priority number for each cell along such paths.

Returning to FIG. 3, the paging method may further comprise removing the duplicate cells from the paging list at block 308. When creating the paging list at block 304 and expanding the paging list at block 306, it is possible that the paging list may contain some duplicate cells. When a page is broadcast over duplicate cells, additional processing resources are consumed within the wireless network and the limited space within the paging list is unnecessarily consumed. Consequently, it is within the scope of the present disclosure to remove the duplicate cells from the paging list as part of the paging method.

The paging method may further comprise prioritizing the cells in the paging list at block 310. In one embodiment, the base cell may be given the highest priority while each layer of adjacent cells is given successively lower priority as the adjacent cells are located further away from the base cell. In another embodiment, the cell priority is determined using prioritized spatial data, such as the prioritized spatial data shown in table 3. The cells may then be prioritized in order from highest priority corresponding to the highest probability cell to lowest priority corresponding to the lowest probability cell. Cells with a zero probability of connecting with a given WT may be removed from the paging list. Other prioritization methods known to persons of ordinary skill in the art may also be used, if desired.

The paging method may further comprise removing the lower priority cells from the paging list at block 314. In some embodiments of the wireless network, there may be a restriction on the number of cells that may be included in the paging list. Specifically, the size of the paging list may be limited so that the amount of resources the paging method uses does not exceed a predetermined threshold. In such an embodiment, the paging method limits the quantity of cells in the paging list to the predetermined quantity of cells, and removes any additional cells from the paging list. The paging method generally keeps the higher priority cells in the paging list and removes the lower priority cells from the paging list until the quantity of cells in the paging list meets the predetermined quantity. If there is no restriction on the quantity of cells in the paging list, block 314 may be skipped altogether.

The paging method may further comprise paging the cells in the paging list at block 316. Specifically, the paging method may simultaneously page the WT over the cells that are in the paging list. Alternatively, the paging method may sequentially page groups of cells in the paging list. In the sequential paging embodiment, the paging method may sequentially page groups of a predetermined quantity of cells, such as three, five, or ten cells. For example, if the expanded paging list includes thirty cells and is paging groups of ten cells, then the ten cells with the highest priority are paged first, the ten cells with the second highest priority, and then the ten cells with the lowest priority. Alternatively, the paging method may sequentially page groups of a predetermined percentage of cells, such as ten, twenty, twenty-five, or thirty-three percent of the cells. For example, if the expanded paging list includes thirty cells and is paging groups of thirty-three percent of the cells, then the ten cells with the highest priority are paged first, the ten cells with the second highest priority, and then the ten cells with the lowest priority. Further in the alternative, the paging method may sequentially page the WT using one cell in the paging list at a time. As part of the sequential paging process, the paging method may page the highest priority cell in the paging list first, and then proceeds to lower priority cells until the WT is located. Regardless of whether simultaneous or sequential paging is used, if the WT is not located after paging all of the cells in the paging list, then the paging method may page the cells in the paging list a second time. In addition or alternatively, the paging method may page the cells that were removed from the paging list during the modification of the paging list at block 320. For example any cells that were removed at block 314 may also be considered for a second or subsequent paging attempt based on their priority.

Figure 4:
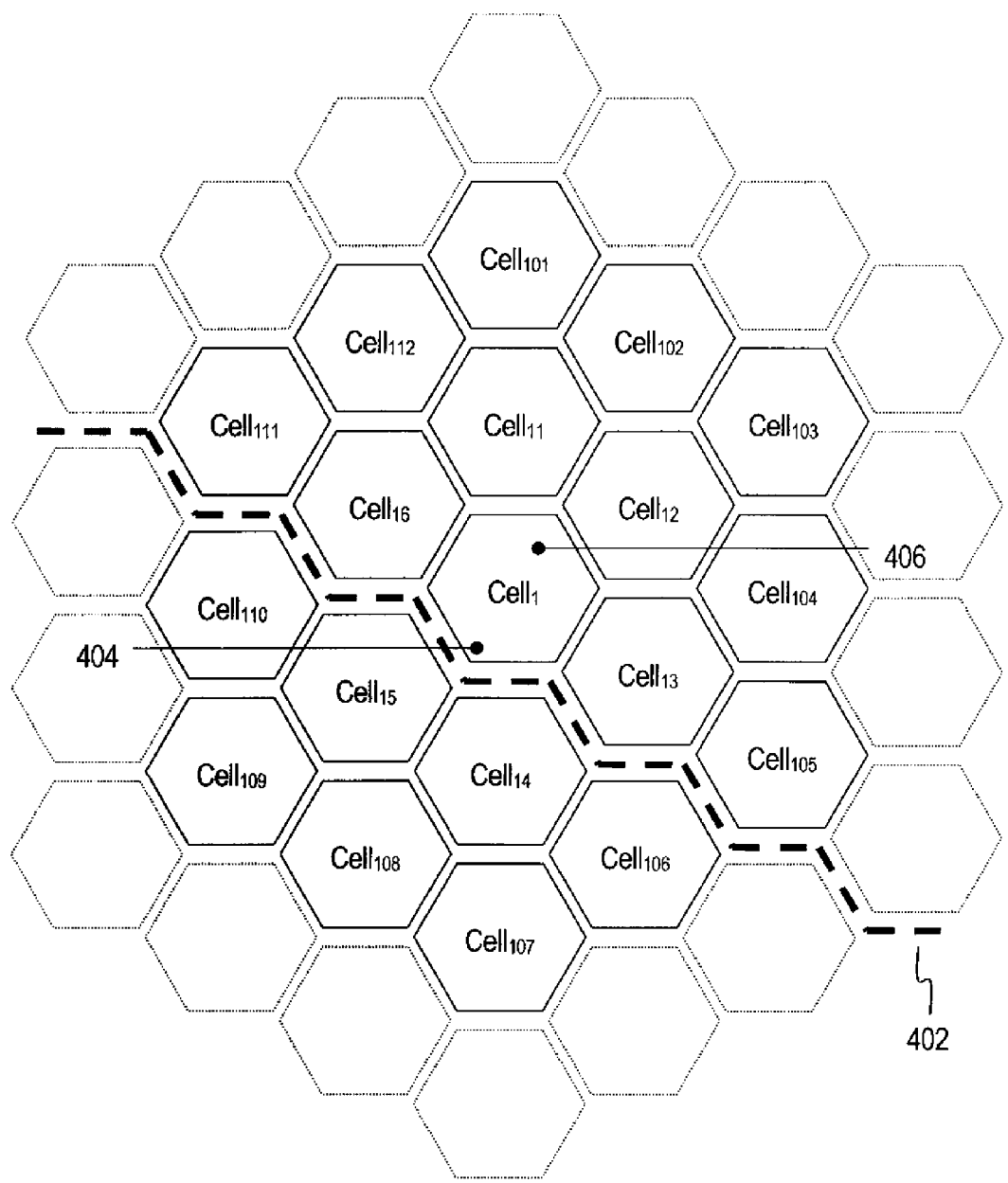
FIG. 4 is a diagram of one embodiment of the cells in two location areas.

The paging method will now be discussed in conjunction with an exemplary grouping of cells illustrated in FIG. 4. As shown in FIG. 4, there is a plurality of cells representing the coverage areas of various BTSs. Similar to the case described with FIG. 2, while each of the cells is depicted as non-overlapping discontinuous regions, this is merely for illustrative purposes to particularly indicate that each cell has a unique coverage area. The cells above the dotted line 402 are cells within a first LA, $LA_1$. The cells below the dotted line 402 are cells within a second LA, $LA_2$.

In a first example, the wireless network receives a request to establish communications with WT 406 in accordance with block 302. The location data may be used to determine the base cell ($Cell_1$) for the WT 406, which is used to create the paging list in accordance with block 304. The spatial data may also be used to identify cells adjacent to the base cell ($Cell_{11}$, $Cell_{12}$, $Cell_{13}$, $Cell_{14}$, $Cell_{15}$, and $Cell_{16}$), which may be combined with the base cell in the paging list in accordance with block 306. If the paging list is expanded a second time, then the paging list would also include $Cell_{101}$, $Cell_{102}$, $Cell_{103}$, $Cell_{104}$, $Cell_{105}$, $Cell_{106}$, $Cell_{107}$, $Cell_{108}$, $Cell_{109}$, $Cell_{110}$, $Cell_{111}$, and $Cell_{112}$. Because there are no duplicates in the paging list, none of the cells need to be removed from the paging list in accordance with block 308. In this particular embodiment, the cells are prioritized according to distance from the base cell per block 310, such that the paging list is ($Cell_1$, $Cell_{11}$-$Cell_{16}$, and $Cell_{101}$-$Cell_{112}$). If there is a restriction on the quantity of cells in the paging list, ten cells for example, then the lowest priority cells exceeding ten cells may be removed per block 314 to create the following paging list ($Cell_1$, $Cell_{11}$-$Cell_{13}$, $Cell_{16}$, and $Cell_{101}$-$Cell_{105}$). These cells may then broadcast the paging message in a first attempt at establishing communication with WT 406 in accordance with block 316.

In a second example, the wireless network receives a request to establish communications with WT 404 in accordance with block 302. The location data and the spatial data may be used to generate the paging list for the WT 404, wherein the paging list is expanded twice to produce the following paging list: ($Cell_1$, $Cell_{11}$, $Cell_{12}$, $Cell_{13}$, $Cell_{14}$, $Cell_{15}$, $Cell_{16}$, $Cell_{101}$, $Cell_{102}$, $Cell_{103}$, $Cell_{104}$, $Cell_{105}$, $Cell_{106}$, $Cell_{107}$, $Cell_{108}$, $Cell_{109}$, $Cell_{110}$, $Cell_{111}$, and $Cell_{112}$), in accordance with block 318. There are no duplicate cells to remove from the paging list in accordance with block 308. The paging list may then be prioritized in accordance with block 310. Specifically, the prioritized spatial data may be used to rank the paging list by the cells' priority, such that it looks like ($Cell_1$, $Cell_{14}$, $Cell_{15}$, $Cell_{13}$, $Cell_{16}$, $Cell_{108}$, $Cell_{11}$, $Cell_{12}$, $Cell_{101}$, $Cell_{105}$, $Cell_{106}$, $Cell_{107}$, $Cell_{109}$, $Cell_{102}$, $Cell_{103}$, $Cell_{104}$, $Cell_{110}$, $Cell_{111}$, and $Cell_{112}$). As part of the prioritization, the cells have been prioritized based on their probability for connecting with WT 404, where cells with equal probability are further prioritized based on their distance from the base cell. In addition, cells with a zero probability of connecting with the WT 404 may be removed from the paging list. If the paging list is limited to 10 cells, the excess cells may be removed from the paging list per block 314 such that the paging list becomes ($Cell_1$, $Cell_{14}$, $Cell_{15}$, $Cell_{13}$, $Cell_{16}$, $Cell_{108}$, $Cell_{11}$, $Cell_{12}$, $Cell_{101}$, and $Cell_{105}$). The cells in the paging list may then send a page in a first attempt at making a connection with WT 404 in accordance with block 316.

Described above is a simple solution that is well suited in WLL networks where the majority of terminals are fixed wireless terminals. Using the paging method described above, the success rate for connecting to a WT on the first paging attempt is substantially improved compared to a single cell-based paging method. In addition, the disclosed paging method reduces the paging traffic and paging load as compared to previous LA paging methods.

Figure 5:
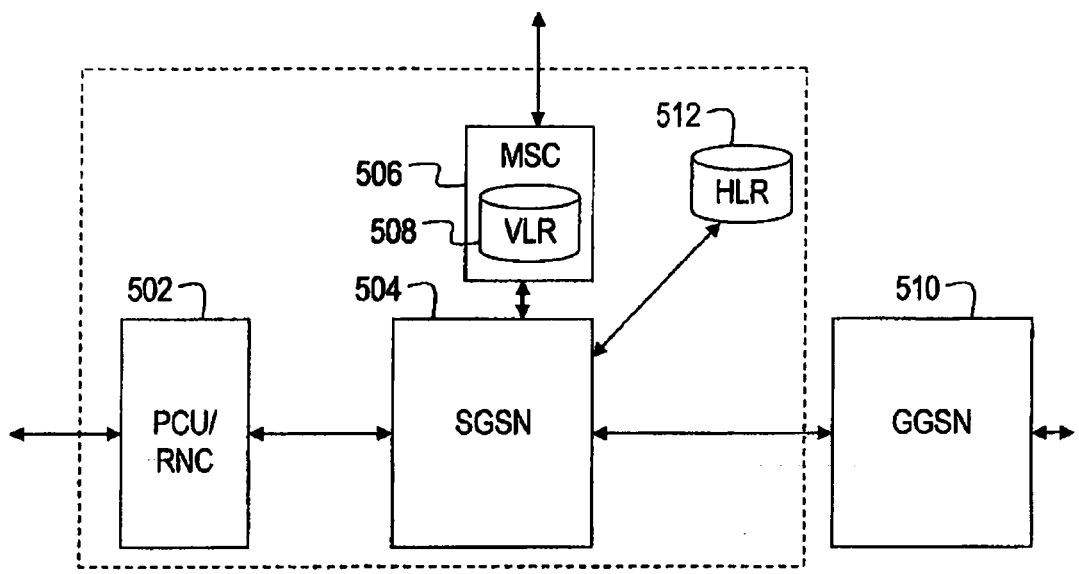
FIG. 5 is an example of the conceptual framework of the radio access controller.

While the paging method described above may be used in conjunction with a WLL wireless network, it may similarly be used for paging wireless terminals in other wireless networks, including the Global System for Mobile Communications (GSM), Code Division Multiple Access (CDMA), Wideband Code Division Multiple Access (WCDMA), General Packet Radio Services (GPRS), and so forth. FIG. 5 depicts a GPRS core network. The network of FIG. 5 is similar to that illustrated in FIG. 1 wherein the RAC 110 is replaced by the components of FIG. 5 inside the dashed line. The packet control unit (PCU)/radio network controller (RNC) 502 in conjunction with the serving GPRS support node (SGSN) 504 acts as a BSC for controlling the operation of each of the BTSs 106. These operations may include location updates, paging, handoff, and so forth. A PCU may be used in GSM networks, whereas an RNC may be used in universal mobile telecommunications system (UMTS) networks. The mobile switching center (MSC) 506 is a telephone exchange for connecting mobile-to-mobile or PSTN 118 calls with a corresponding wireless terminal in the LA of the MSC 506. In order to assist with establishing this connection, a visitor location register (VLR) 508 may be used to temporarily store data similar to that stored in the VDB 112 for each of the wireless terminals in the LA. The home location register (HLR) 512 is a centralized database that stores details of each terminal station in the network. The MSC 506 may obtain the information for each wireless terminal in the LA for temporary storage in the VLR 508 from the HLR 512. As depicted in FIG. 5 the HLR 512 is connected to the MSC 506 through the SGSN 504, however, the MSC 506 may have a direct connection with the HLR 512. The gateway GPRS support node (GGSN) 510 replaces the PDSN 120 to provide the connection between the wireless network and data networks, such as the Internet.

In the network of FIG. 5, the operation of the paging extension described in FIG. 3 may be implemented in PCU/RNC 502 or the SGSN 504 since these network elements may store information relating to which cells are in the current LA and their special relation to each other. This information may be used in conjunction with the location data stored in the VLR 508 to extend the paging list for the first paging attempt.

A difference between the networks of FIGS. 1 and 5 is that the majority of terminals in the network of FIG. 1 may be fixed, whereas the majority of terminals in the network of FIG. 5 are mobile. With the mobility of the terminals in the network of FIG. 5, there may be additional complexity in determining the paging list. In particular, the operations performed at block 320 may be modified in order to generate the paging list that is more likely to establish a connection with a wireless terminal in a first paging attempt. For example, the VLR 508 may store additional location data, such as normal travel patterns for a wireless terminal. In addition, the statistical data may include probabilities for each cell based on additional factors, such as the time of day. Looking to the exemplary cells of FIG. 4, a wireless terminal may have established a normal travel pattern of moving from $Cell_1$ to $Cell_{11}$ to $Cell_{102}$ in the morning and the reverse in the evening. If the wireless terminal bad last connected to $Cell_{11}$ and needs to be located, at block 306 it may be determined that the paging list ($Cell_1$, $Cell_{11}$, $Cell_{102}$) be used based on the wireless terminal's normal travel pattern. At block 310 the priority of the cells may be different depending on the time of day. For example, if the wireless terminal is being located in the morning the cells may be prioritized as ($Cell_{11}$, $Cell_{102}$, and $Cell_1$) to follow the normal travel pattern. On the other hand, if the wireless terminal is being located in the evening the cells may be prioritized as ($Cell_{11}$, $Cell_1$, and $Cell_{102}$). While the above example used travel patterns and the time of day to modify blocks 306 and 310 it is noted that any other paging prediction method may be used in conjunction with the method described in FIG. 3.

Described above is a simple method that may be used in any wireless network. Using the method described above, the success rate for connecting to a WT 102 on the first paging attempt is improved compared to a single cell-based paging method, while at the same time the paging traffic and paging load is greatly reduced as compared to previous LA paging methods.

Figure 6:
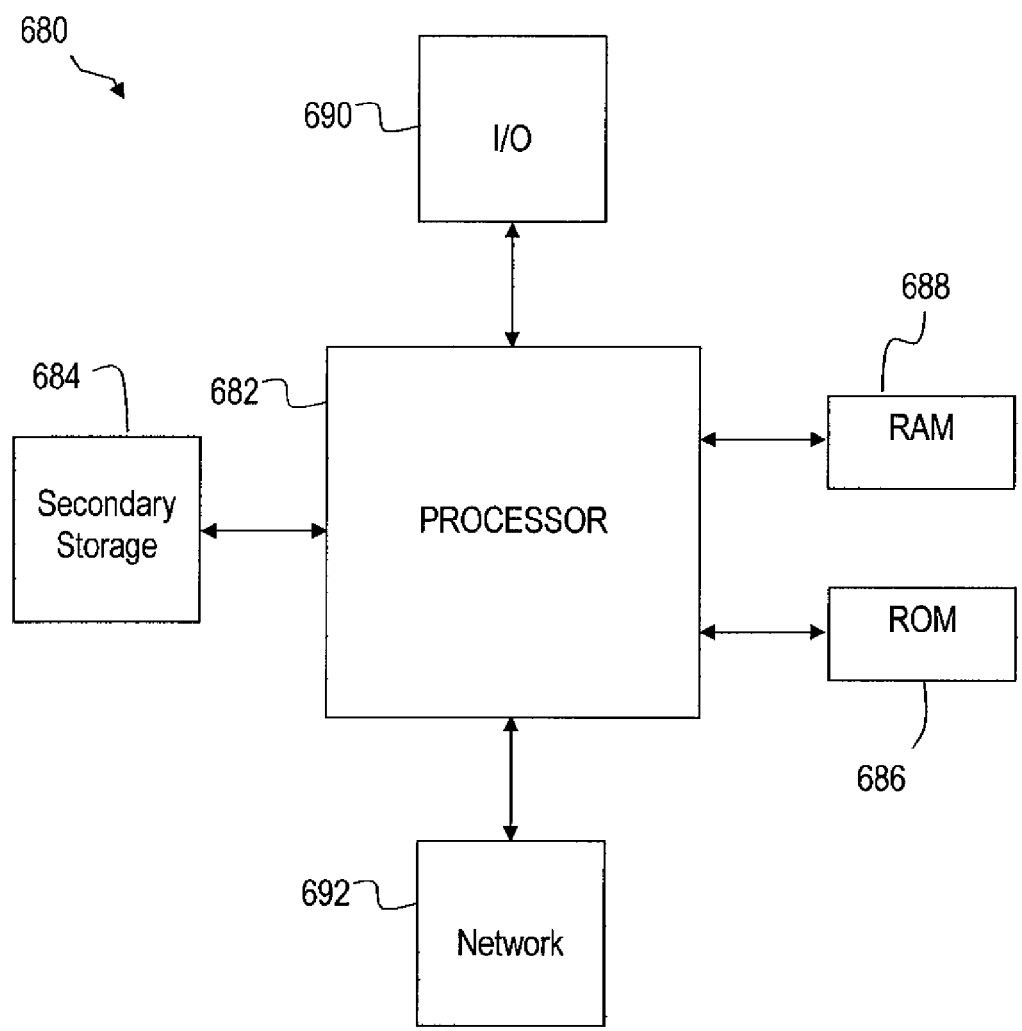
FIG. 6 illustrates an exemplary general purpose computer system suitable for implementing the several embodiments of the disclosure.

Each of the components in the wireless networks described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor 682 may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as CDMA and/or GSM radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk-based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A wireless network component comprising:
 a processor configured to implement steps comprising:
 receiving a request to establish communications with a wireless terminal;
 subsequently generating a paging list, wherein the paging list comprises a base cell;
 expanding the paging list to include a first set of cells, wherein the first set of cells includes all cells adjacent to the base cell, and wherein the network component has no record of the wireless terminal entering at least one of the cells of the first set of cells;
 removing any duplicate cells from the paging list;
 prioritizing the cells in the paging list,
 wherein the cells in the paging list are prioritized based on the probability that the wireless terminal will connect with the cells in the paging list, and wherein the probability is a number;
 removing any lower priority cells from the paging list; and
 paging the wireless terminal using the cells in the paging list,
 wherein the wireless network is a wireless local loop.

2. The component of claim 1, wherein the base cell is the cell that the wireless terminal most recently connected with.

3. The component of claim 1, wherein the cells adjacent the base cell are physically next to the base cell or overlapping the base cell.

4. The component of claim 1, wherein the steps further comprise: expanding the paging list to include a second set of cells, wherein the second set of cells includes all cells adjacent to the first set of cells.

5. The component of claim 1, wherein the cells in the paging list are prioritized based on the distance from the base cell.

6. The component of claim 1, wherein removing lower priority cells comprises removing lower priority cells from the paging list until the cells in the paging list no longer exceed a predetermined quantity.

7. The component of claim 1, wherein the first set of cells is based on location data that includes the cell that the wireless terminal last connected with and other cells that the wireless terminal has previously connected with.

8. The component of claim 1, wherein the wireless terminal is paged using code division multiple access (CDMA).

9. A wireless network comprising:
 a controller coupled to a data network;
 a plurality of base transceiver stations coupled to the controller, the base transceiver stations in wireless communication with a plurality of wireless terminals; and
 a database in communication with the controller or one of the base transceiver stations, the database comprising a location data;
 wherein communication is established between one of the wireless terminals and the data network, the communication being established at least in part by the controller identifying a group of base transceiver stations corresponding to the location data for the wireless terminal, and limiting a transmission of a paging message to the group of base transceiver stations, wherein the group of base transceiver stations comprises a first base transceiver station and a plurality of adjacent base transceiver stations, wherein at least one of the group of base transceiver stations has no record of previous communication with the wireless terminal, wherein the database comprises probability data that identifies a probability for the wireless terminal to respond to the paging message sent by each of the base transceiver stations and the group is prioritized based on the probability, wherein the controller further prioritizes the group, removes any duplicate base transceiver stations from the group, and removes any lower priority base transceiver stations that exceed a predetermined quantity, prior to transmission of the paging message, and wherein the wireless network is a wireless local loop.

10. The wireless network of claim 9, wherein the terminal most recently connected to the first base transceiver station, and wherein the group is identified and prioritized based on a spatial data related to the first base transceiver station.

11. The network of claim 9, wherein the location data comprises a plurality of the base transceiver stations that have been in communication with the wireless terminal, and wherein the probability data comprises the plurality of adjacent base transceiver stations and a number that indicates the probability of each adjacent base transceiver station being able to successfully page the wireless terminal.

12. A method of paging a wireless terminal in a wireless network, the method comprising:
- receiving a request to establish communications with a wireless terminal;
- creating a paging list comprising a plurality of cells, the paging list being created using a location data to define a base cell;
- expanding the paging list using a spatial data to include a first set of cells adjacent to the base cell;
- further expanding the paging list to include a second set of cells, at least some of which are adjacent to the first set of cells;
- removing any duplicate cells from the paging list;
- calculating a probability of a likelihood of the wireless terminal being present in a cell of the paging list,
- wherein a modified probability of the second set of cells is calculated by multiplying a probability of the first set of cells by an original probability of the second set of cells;
- prioritizing the cells in the paging list;
- removing any low priority cells from the paging list; and
- paging the wireless terminal using the cells in the paging list,
- wherein the wireless network is a wireless local loop.

13. The method of claim 12, wherein the probability is a number.

* * * * *